United States Patent
Aiba et al.

(10) Patent No.: US 12,151,234 B2
(45) Date of Patent: Nov. 26, 2024

(54) APPARATUS FOR PRETREATING ION EXCHANGE RESIN AND METHOD FOR PRETREATING ION EXCHANGE RESIN

(71) Applicant: ORGANO CORPORATION, Tokyo (JP)

(72) Inventors: Kenta Aiba, Tokyo (JP); Akira Nakamura, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 660 days.

(21) Appl. No.: 17/426,274

(22) PCT Filed: Sep. 27, 2019

(86) PCT No.: PCT/JP2019/038122
§ 371 (c)(1),
(2) Date: Jul. 28, 2021

(87) PCT Pub. No.: WO2020/158048
PCT Pub. Date: Aug. 6, 2020

(65) Prior Publication Data
US 2022/0105505 A1 Apr. 7, 2022

(30) Foreign Application Priority Data
Jan. 30, 2019 (JP) ................. 2019-013873

(51) Int. Cl.
*B01J 49/60* (2017.01)
*B01J 41/07* (2017.01)
*B01J 41/12* (2017.01)

(52) U.S. Cl.
CPC .............. *B01J 49/60* (2017.01); *B01J 41/07* (2017.01); *B01J 41/12* (2013.01)

(58) Field of Classification Search
USPC ............................................ 210/676; 521/26
See application file for complete search history.

(56) References Cited

U.S. PATENT DOCUMENTS

| 5,443,740 A | 8/1995 | Schmitt |
| 2014/0163264 A1 | 6/2014 | Takahashi et al. |

FOREIGN PATENT DOCUMENTS

| CN | 103687836 A | 3/2014 |
| JP | S56-60648 A | 5/1981 |

(Continued)

OTHER PUBLICATIONS

Machine-generated English language translation of JP 5930921, published Jun. 8, 2016, 8 pages; retrieved from ESPACENET on Mar. 12, 2024. (Year: 2016).*

(Continued)

*Primary Examiner* — Fred M Teskin
(74) *Attorney, Agent, or Firm* — GREENBLUM & BERNSTEIN, P.L.C.

(57) ABSTRACT

An apparatus for pretreating an ion exchange resin includes at least a stock solution tank for storing a non-aqueous solvent, an ion exchange resin container accommodating an ion exchange resin, and a moisture removal apparatus for removing moisture in the non-aqueous solvent, and at least one solution feed pipe selected from: a circulating solution feed pipe for returning, to the stock solution tank, the non-aqueous solvent that has passed through the ion exchange resin container and the moisture removal apparatus in this order from the stock solution tank; and a circulating solution feed pipe for returning, to the stock solution tank, the non-aqueous solvent that has passed through the moisture removal apparatus and the ion exchange resin container in this order from the stock solution tank.

7 Claims, 5 Drawing Sheets

(56) References Cited

FOREIGN PATENT DOCUMENTS

| | | |
|---|---|---|
| JP | S61-151241 A | 7/1986 |
| JP | H6-238271 A | 8/1994 |
| JP | H7-8810 A | 1/1995 |
| JP | 11-276801 A | 10/1999 |
| JP | 2000-505042 A | 4/2000 |
| JP | 2013-23440 A | 2/2013 |
| JP | 2014-55120 A | 3/2014 |
| JP | 5762861 B2 | 8/2015 |
| JP | 5762863 B2 | 8/2015 |
| JP | 5930921 B2 | 6/2016 |
| WO | 2017/116759 A1 | 7/2017 |
| WO | 2018/043697 A1 | 3/2018 |

OTHER PUBLICATIONS

Extended European Search Report issued in corresponding European Patent Application No. 19913688.8 dated Sep. 21, 2022.
Office Action issued in Japanese Patent Application No. 2019-013873 dated May 31, 2022, along with English translation.
Office Action issued to Chinese Patent Application No. 201980064270.X dated Dec. 8, 2022, along with English translation thereof.
ISR for PCT/JP2019/038122, dated Dec. 17, 2019 (w/ translation).

\* cited by examiner

APPARATUS FOR PRETREATING ION EXCHANGE RESIN AND METHOD FOR PRETREATING ION EXCHANGE RESIN

TECHNICAL FIELD

The present invention relates to an apparatus for pretreating an ion exchange resin and a method for pretreating an ion exchange resin.

BACKGROUND ART

In recent years, a purified non-aqueous solvent with impurities highly removed have come to be used in a semiconductor production process or as an electrolytic solution for a lithium ion battery.

As a method for purifying a non-aqueous solvent, a distillation method for removing impurities by distillation is known. However, the method not only requires high cost of equipment and large energy in distillation treatment, but also has technical problems such as difficulty in purification at a high level.

Accordingly, in recent years, a method for purifying a non-aqueous solvent by an ion exchange method using an ion exchange resin or an ion exchange filter has been proposed. It is said that by an ion exchange method, impurities can be highly purified and removed at low cost of equipment with energy saved.

For example, an electrolytic solution for a lithium ion battery is produced by dissolving an electrolyte such as a fluorine-based lithium salt in a non-aqueous solvent.

Since acids (mainly hydrogen fluoride) behave as impurities in an electrolytic solution, a purification method for removing the acids with an ion exchange resin has been studied. However, since moisture also behaves as impurity at the same time, pretreatment for reducing the moisture contained in the ion exchange resin is required to prevent the moisture contained in the ion exchange resin from eluting into the electrolytic solution.

As the method for reducing the moisture contained in the ion exchange resin, a method of drying the ion exchange resin under reduced pressure, and a removal method of passing a non-aqueous solvent through the ion exchange resin in addition to drying under reduced pressure are known (for example, refer to Patent Literature 1 (Japanese Translation of PCT International Application Publication No. 2000-505042)).

CITATION LIST

Patent Literature

[Patent Literature 1] Japanese Translation of PCT International Application Publication No. 2000-505042

SUMMARY OF INVENTION

Technical Problem

However, as a result of studies by the present inventors, it has been found that by the method of drying under reduced pressure, the moisture contained in an ion exchange resin cannot be sufficiently reduced, and by the method of passing a non-aqueous solvent in addition to drying under reduced pressure, a large amount of non-aqueous solvent such as several tens to several hundreds times the amount of the ion exchange resin is required.

Under such circumstances, an object of the present invention is to provide an apparatus for pretreating an ion exchange resin and a method for pretreating an ion exchange resin, capable of easily and economically reducing the moisture content.

The present inventors, as a result of repeated studies to achieve the object, have found that the technical problem can be solved by an apparatus for pretreating an ion exchange resin comprising at least a stock solution tank for storing a non-aqueous solvent, an ion exchange resin container accommodating an ion exchange resin, and a moisture removal apparatus for removing moisture in the non-aqueous solvent, and at least one solution feed pipe selected from: a circulating solution feed pipe for returning, to the stock solution tank, the non-aqueous solvent that has passed through the ion exchange resin container and the moisture removal apparatus in this order from the stock solution tank; and a circulating solution feed pipe for returning, to the stock solution tank, the non-aqueous solvent that has passed through the moisture removal apparatus and the ion exchange resin container, so that the present invention has been completed based on the finding.

In other words, the present invention provides the following.

(1) An apparatus for pretreating an ion exchange resin comprising:
  at least a stock solution tank for storing a non-aqueous solvent, an ion exchange resin container accommodating an ion exchange resin, and a moisture removal apparatus for removing moisture in the non-aqueous solvent, and
  at least one solution feed pipe selected from: a circulating solution feed pipe for returning, to the stock solution tank, the non-aqueous solvent that has passed through the ion exchange resin container and the moisture removal apparatus in this order from the stock solution tank; and
  a circulating solution feed pipe for returning, to the stock solution tank, the non-aqueous solvent that has passed through the moisture removal apparatus and the ion exchange resin container in this order from the stock solution tank.

(2) The apparatus for pretreating an ion exchange resin according to item (1), wherein the moisture removal apparatus is a moisture adsorption apparatus.

(3) The apparatus for pretreating an ion exchange resin according to item (2), wherein the moisture adsorption apparatus accommodates zeolite as moisture adsorbent.

(4) The apparatus for pretreating an ion exchange resin according to item (3), wherein the circulating solution feed pipe is disposed such that the non-aqueous solvent circulating in the circulating solution feed pipe passes upward through the zeolite accommodated in the moisture adsorption apparatus.

(5) The apparatus for pretreating an ion exchange resin according to any one of items (1) to (4), further comprising a filtration apparatus on the downstream side of the moisture removal apparatus.

(6) The apparatus for pretreating an ion exchange resin according to any one of items (1) to (5), wherein the ion exchange resin is an anion exchange resin.

(7) The apparatus for pretreating an ion exchange resin according to any one of items (1) to (6), wherein the ion exchange resin is a weakly basic anion exchange resin.

(8) A method for pretreating an ion exchange resin comprising:

with the use of an apparatus for pretreating an ion exchange resin having at least a stock solution tank for storing a non-aqueous solvent, an ion exchange resin container accommodating an ion exchange resin, and a moisture removal apparatus for removing moisture in the non-aqueous solvent, performing at least one solution feed process with the non-aqueous solvent circulated, the at least one solution feed process selected from: solution feed process involving returning the non-aqueous solvent that has passed through the ion exchange resin container and the moisture removal apparatus in this order from the stock solution tank, to the stock solution tank; and solution feed process involving returning the non-aqueous solvent that has passed through the moisture removal apparatus and the ion exchange resin container in this order from the stock solution tank, to the stock solution tank.

Advantageous Effect of Invention

According to the present invention, an apparatus for pretreating an ion exchange resin and a method for pretreating an ion exchange resin, capable of easily and economically reducing the moisture content, can be provided.

DESCRIPTION OF EMBODIMENT

An apparatus for pretreating an ion exchange resin of the present invention comprises at least a stock solution tank for storing a non-aqueous solvent, an ion exchange resin container accommodating an ion exchange resin, and a moisture removal apparatus for removing moisture in the non-aqueous solvent, and at least one solution feed pipe selected from: a circulating solution feed pipe for returning, to the stock solution tank, the non-aqueous solvent that has passed through the ion exchange resin container and the moisture removal apparatus in this order from the stock solution tank; and a circulating solution feed pipe for returning, to the stock solution tank, the non-aqueous solvent that has passed through the moisture removal apparatus and the ion exchange resin container in this order from the stock solution tank.

The apparatus for pretreating an ion exchange resin of the present invention is appropriately described with reference to drawings as follows.

Figure 1:
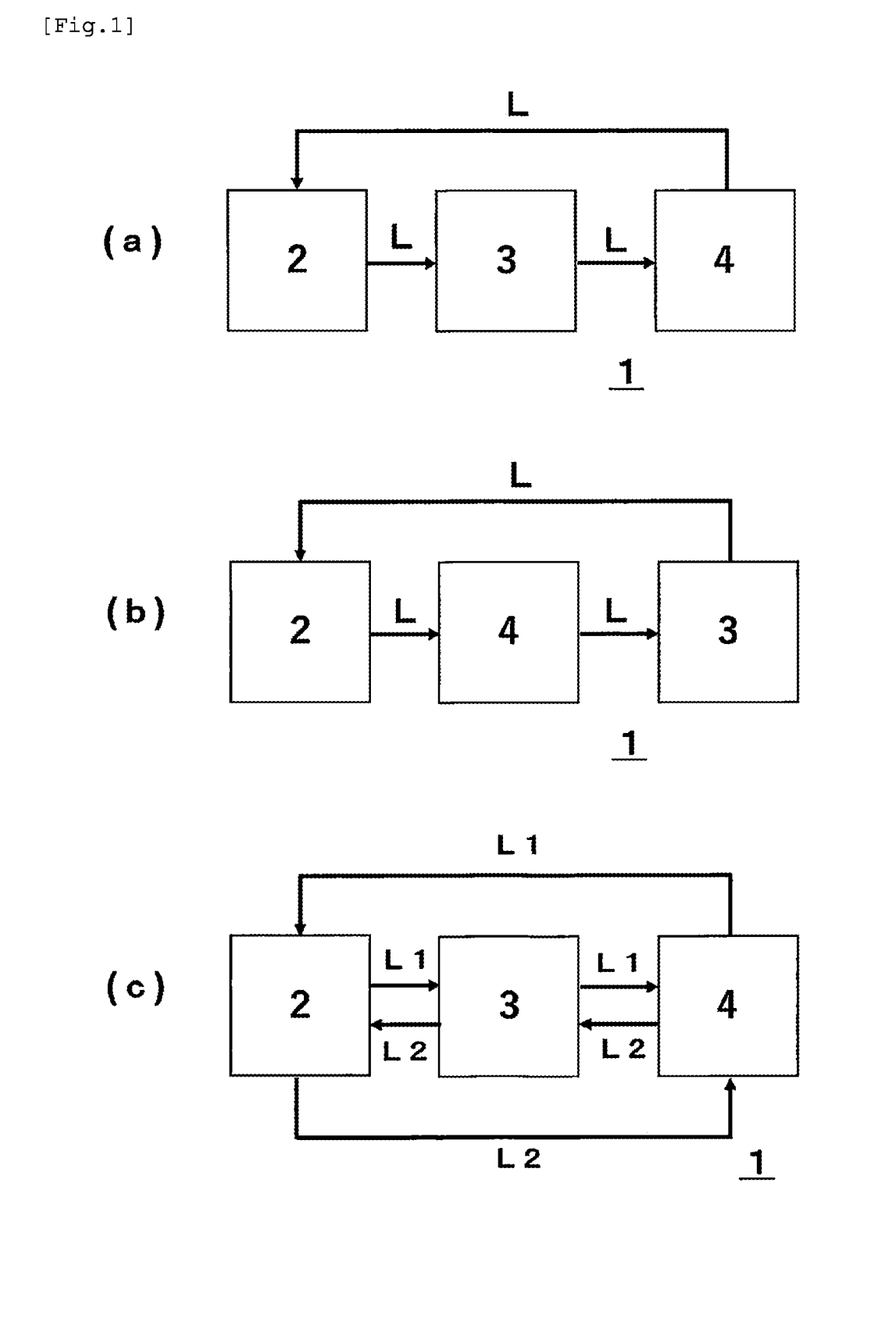
FIG. 1 is a chart illustrating a structure of the apparatus for pretreating an ion exchange resin of the present invention.

FIG. 1 is a chart illustrating a structure of the apparatus for pretreating an ion exchange resin of the present invention.

As shown in FIG. 1 (a) to FIG. 1 (c), an apparatus 1 for pretreating an ion exchange resin of the present invention has at least a stock solution tank 2 for storing a non-aqueous solvent, an ion exchange resin container 3 accommodating an ion exchange resin, and a moisture removal apparatus 4 for removing moisture in the non-aqueous solvent.

The apparatus for pretreating an ion exchange resin of the present invention has a circulating solution feed pipe for returning the non-aqueous solvent fed from a stock solution tank to the stock solution tank.

The apparatus 1 for pretreating an ion exchange resin of the present invention has at least one solution feed pipe selected from a circulating solution feed pipe L for returning, to a stock solution tank 2, the non-aqueous solvent that has passed through an ion exchange resin container 3 and a moisture removal apparatus 4 in this order from the stock solution tank 2 as illustrated in FIG. 1 (a), and a circulating solution feed pipe L for returning, to a stock solution tank 2, the non-aqueous solvent that has passed through a moisture removal apparatus 4 and an ion exchange resin container 3 in this order from the stock solution tank 2 as illustrated in FIG. 1 (b).

The apparatus 1 for pretreating an ion exchange resin of the present invention may have a circulating solution feed pipe L1 for returning, to a stock solution tank 2, the non-aqueous solvent that has passed through an ion exchange resin container 3 and a moisture removal apparatus 4 in this order from the stock solution tank 2, and a circulating solution feed pipe L2 for returning, to a stock solution tank 2, the non-aqueous solvent that has passed through the moisture removal apparatus 4 and the ion exchange resin container 3 in this order from the stock solution tank 2 as illustrated in FIG. 1 (c).

In the aspect illustrated in FIG. 1 (c), when the non-aqueous solvent is passed, a valve disposed in one of the circulating solution feed pipe L1 and the circulating solution feed pipe L2 is closed to pass the solution through the other solution feed pipe.

In the apparatus for pretreating an ion exchange resin of the present invention, examples of the non-aqueous solvent include an organic non-aqueous solvent.

It is preferable that the non-aqueous solvent be the same as the non-aqueous solvent to be passed through the ion exchange resin after the pretreatment by the apparatus for pretreating an ion exchange resin of the present invention.

Examples of the organic non-aqueous solvent include one or more selected from methanol, ethanol, n-propyl alcohol, isopropyl alcohol (IPA), tert-butyl alcohol, ethylene glycol, diethylene glycol, glycerol, N-methyl-2-pyrrolidone (NMP), dimethyl sulfoxide (DMSO), propylene glycol monomethyl ether (PGME), propylene glycol monomethyl ether acetate (PGMEA), butyl carbitol (BDG), monoethanolamine (MEA), methyl lactate, ethyl lactate, ethyl acetate, butyl acetate, isoamyl acetate, acetone, methyl ethyl ketone (MEK), methyl isobutyl ketone (MIBK), toluene, xylene, cyclohexane, ethylene carbonate, propylene carbonate, dimethyl carbonate, diethyl carbonate, methylethyl carbonate, γ-butyrolactone, sulfolane, 1,2-dimethoxyethane, 1,2-diethoxyethane, 1,2-dibutoxyethane, and ethoxymethoxyethane.

The apparatus for pretreating an ion exchange resin of the present invention has an ion exchange resin container accommodating an ion exchange resin through which a non-aqueous solvent passes.

The ion exchange resin is not particularly limited, and an organic polymer-based ion exchange resin having a matrix of organic polymer is preferred. Examples of the organic polymer to make the matrix include a styrene-based resin and an acrylic-based resin.

In the present application document, the styrene-based resin means a resin containing 50 mass % or more of structural units derived from styrene or a styrene derivative, obtained by homopolymerizing or copolymerizing styrene or a styrene derivative.

Examples of the styrene derivative include α-methylstyrene, vinyltoluene, chlorostyrene, ethylstyrene, i-propylstyrene, dimethylstyrene and bromostyrene.

The styrene-based resin may be a copolymer with another copolymerizable vinyl monomer as long as the resin contains a homopolymer or a copolymer of styrene or a styrene derivative as the main component. Examples the vinyl monomer include a polyfunctional monomers including a divinylbenzene such as o-divinylbenzene, m-divinylbenzene and p-divinylbenzene, an alkylene glycol di(meth)acrylate such as ethylene glycol di(meth)acrylate and polyethylene glycol di(meth)acrylate, and one or more selected from (meth)acrylonitrile, methyl (meth)acrylate, etc.

As the other copolymerizable vinyl monomer, ethylene glycol di(meth)acrylate, polyethylene glycol di(meth)acrylate having 4 to 16 polymerized ethylene units and divinylbenzene are more preferred, divinylbenzene and ethylene glycol di(meth)acrylate are still more preferred, and divinylbenzene is furthermore preferred.

In the present application document, an acrylic-based resin means a resin containing 50 mass % or more of a structural unit derived from an acrylic acid, a structural unit derived from a methacrylic acid, a structural unit derived from an acrylate and a structural unit derived from a methacrylate, obtained by homopolymerizing, or copolymerizing one or more selected from an acrylic acid, a methacrylic acid, an acrylate, and a methacrylate.

More specifically, examples of the acrylic resin include a homopolymer of acrylic acid, a homopolymer of methacrylic acid, a homopolymer of acrylate, a homopolymer of methacrylate, a copolymer of acrylic acid and another monomer (e.g., acrylate, methacrylic acid, methacrylate, and α-olefin (e.g., ethylene and divinylbenzene)), a copolymer of methacrylic acid and another monomer (e.g., acrylic acid, acrylate, methacrylate, and α-olefin (e.g., ethylene and divinylbenzene)), a copolymer of acrylate and another monomer (e.g., acrylic acid, methacrylic acid, methacrylate, and α-olefin (e.g., ethylene and divinylbenzene)), and a copolymer of methacrylate and another monomer (e.g., acrylic acid, acrylate, methacrylic acid, and α-olefin (e.g., ethylene and divinylbenzene)), and in particular, a methacrylic acid-divinylbenzene copolymer or an acrylic acid-divinylbenzene copolymer is preferred.

As the acrylate, an alkyl acrylate is preferred, a linear alkyl acrylate or a branched alkyl acrylate is more preferred, and a linear alkyl acrylate is still more preferred.

As the acrylate, an alkyl acrylate with an alkyl group having 1 to 4 carbon atoms contained in an alkyl ester moiety is still more preferred, methyl acrylate and ethyl acrylate are furthermore preferred, and methyl acrylate is particularly preferred.

As the methacrylate, an alkyl methacrylate is preferred, a linear alkyl methacrylate or a branched alkyl methacrylate is more preferred, and a linear alkyl methacrylate is still more preferred.

As the methacrylate, an alkyl methacrylate with an alkyl group having 1 to 4 carbon atoms contained in an alkyl ester moiety is more preferred, methyl methacrylate and ethyl methacrylate are furthermore preferred, and methyl methacrylate is particularly preferred.

Examples of the ion exchange resin include one or more selected from a cation exchange resin having a cation exchange group, an anion exchange resin having an anion exchange group, and a chelate resin.

Examples of the cation exchange resin include a strongly acidic resin having a sulfo group as cation exchange group, and a weakly acidic resin having a carboxy group as cation exchange group.

Examples of the anion exchange resin include a strongly basic resin having a quaternary ammonium group as anion exchange group, and a weakly basic resin having an amino group as anion exchange group.

In the apparatus for pretreating an ion exchange resin of the present invention, a weakly basic ion exchange resin is preferred as the ion exchange resin accommodated in the ion exchange resin container through which a non-aqueous solvent is passed.

As the weakly basic ion exchange group of the weakly basic ion exchange resin, a primary to tertiary amino group is preferred and a tertiary amino group such as dimethylamino group is more preferred.

Examples of the weakly basic anion exchange group include a tertiary amino group represented by the following general formula (I):

[Formula 1]

(I)

wherein the group $R^1$ and the group $R^2$ are hydrocarbon groups having 1 to 3 carbon atoms and may be the same or different from each other, and * represents a bonding site bonding with a substrate or a bonding group for bonding to a substrate.

In the weakly basic anion exchange group represented by the general formula (I), the group $R^1$ and the group $R^2$ are hydrocarbon groups having 1 to 3 carbon atoms.

Examples of the group $R^1$ and the group $R^2$ include one or more selected from an alkyl group and an alkenyl group, and an alkyl group is preferred.

Specific examples of the group $R^1$ and the group $R^2$ include one or more selected from a methyl group, an ethyl group, a propyl group, and a propylene group, and a methyl group is preferred.

In the weakly basic anion exchange group represented by the general formula (I), the group $R^1$ and the group $R^2$ may be the same or different from each other.

Examples of the weakly basic anion exchange group represented by the general formula (I) include a dimethylamino group, a diethylamino group, and a dipropylamino group, and a dimethylamino group is preferred.

In the general formula (I), * represents a bonding site between a weakly basic anion exchange group represented by the general formula (I) and a substrate or a bonding group for bonding with a substrate.

It is preferable that the weakly basic anion exchange group represented by the general formula (I) be appropriately bonded to a substrate made of styrene-based resin through a group $R^3$ group as bonding group, as shown in the following general formula (II).

[Formula 2]

(II)

wherein the group $R^1$ and the group $R^2$ are hydrocarbon groups having 1 to 3 carbon atoms, which may be the same or different, the group $R^3$ is a hydrocarbon group having 1 to 3 carbon atoms, and * represents a bonding site bonding with a substrate.

Examples of the group $R^1$ and the group $R^2$ include the same ones as in the above.

The group $R^3$ is a hydrocarbon group having 1 to 3 carbon atoms. Examples of the group $R^3$ include one or more selected from an alkylene group and an alkenylene group, and an alkylene group is preferred.

Specific examples of the group $R^3$ include one or more selected from a methylene group (—$CH_2$—), an ethylene group (—$CH_2CH_2$—), and a propylene group (—$CH_2CH_2CH_2$—), and a methylene group is preferred.

The weakly basic anion exchange group represented by the general formula (I) is introduced as a substituent into styrene or a styrene derivative, so that introduction into a styrene-based resin can be achieve.

Such an anion exchange resin may be a commercially available product, and examples thereof include one or more selected from DIAION WA30 manufactured by Mitsubishi Chemical Corporation and ORLITE DS-6 manufactured by Organo Corporation.

The ion exchange resin accommodated in an ion exchange resin container may have a gel-type structure, a macroreticular-type (MR-type) structure, a macroporous-type (MP-type) structure, or a porous-type structure.

The size of the ion exchange resin accommodated in the ion exchange resin container is not particularly limited, and the harmonic mean diameter of the resin is preferably 300 to 1000 μm, more preferably 400 to 800 μm, still more preferably 500 to 700 μm.

The ion exchange resin accommodated in the ion exchange resin container has a total ion exchange capacity in the wet state of preferably 0.1 to 3.0 (eq/L-R), more preferably 0.5 to 2.5 (eq/L-R), still more preferably 1.0 to 2.0 (eq/L-R).

In the apparatus for pretreating an ion exchange resin of the present invention, the accommodation aspect of the ion exchange resin accommodated in the ion exchange resin container is not particularly limited as long as the aspect allows the non-aqueous solvent to be brought into contact with the ion exchange resin.

For example, the ion exchange resin container may be a column or tank filled with an ion exchange resin through which a non-aqueous solvent can be passed.

Further, the ion exchange resin container may be equipped with a pump for passing a non-aqueous solvent.

In the apparatus for pretreating an ion exchange resin of the present invention, the liquid flow rate (liquid space velocity) of the non-aqueous solvent passing through the ion exchange resin in the ion exchange resin container may be appropriately selected from the rates at which the moisture in the ion exchange resin can be removed or reduced.

In the apparatus for pretreating an ion exchange resin of the present invention, it is preferable that the circulating solution feed pipe be disposed such that the non-aqueous solvent circulating in the circulating solution feed pipe passes upward through the ion exchange resin accommodated in the ion exchange resin container.

Figure 2:
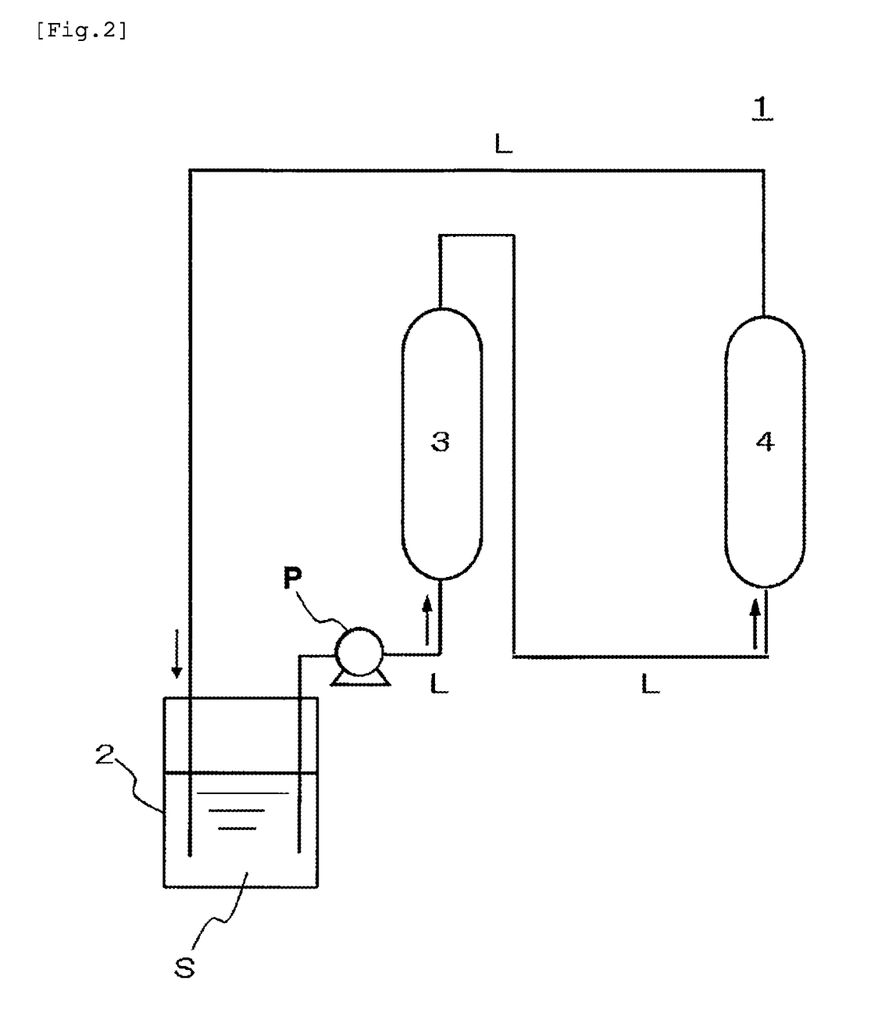
FIG. 2 is a chart illustrating an illustrative aspect of the apparatus for pretreating an ion exchange resin of the present invention.
Figure 3:
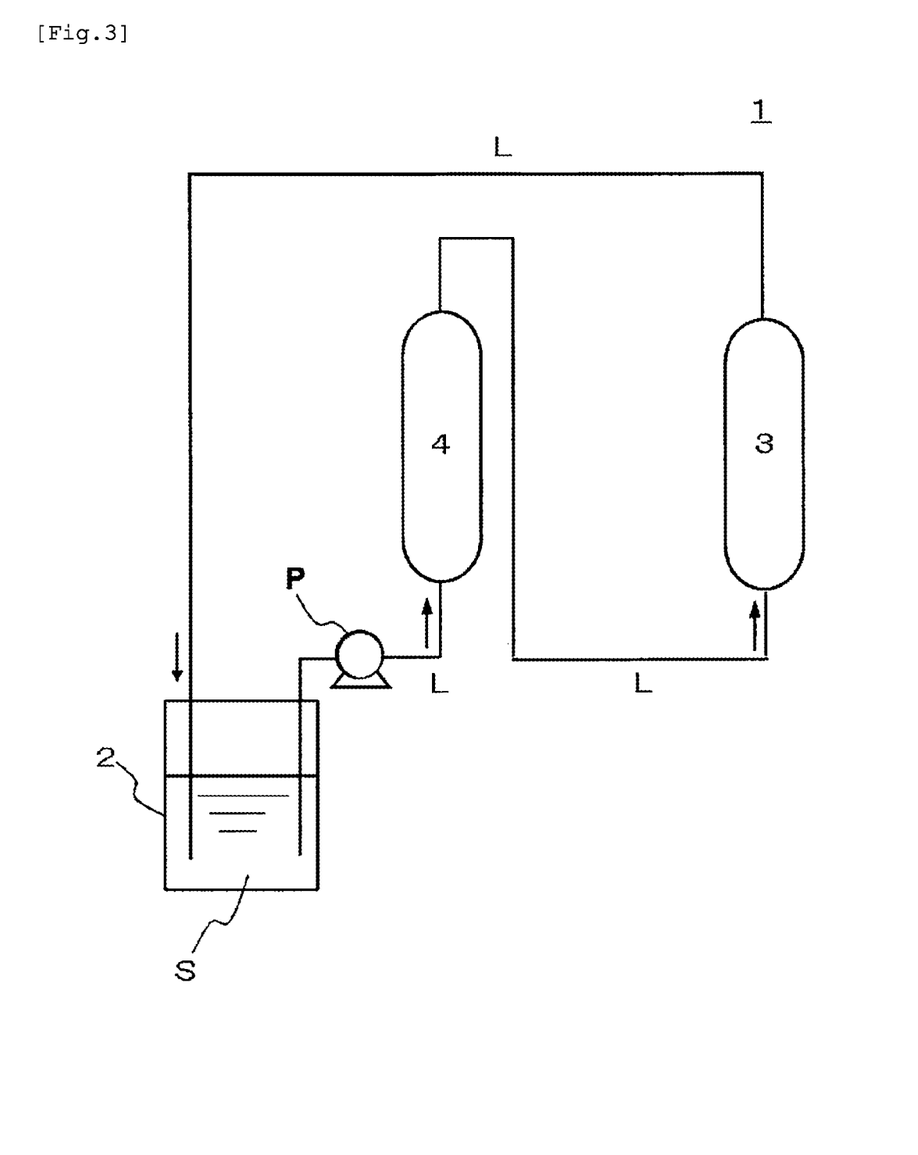
FIG. 3 is a chart illustrating an illustrative aspect of the apparatus for pretreating an ion exchange resin of the present invention.

In other words, as shown in FIG. 2 and FIG. 3, in an apparatus 1 for pretreating an ion exchange resin of the present invention, it is preferable that a circulating solution feed pipe L be disposed such that a circulating non-aqueous solvent S fed from a stock solution tank 2 for storing the non-aqueous solvent passes upward through the ion exchange resin accommodated in an ion exchange resin container 3.

As described above, the circulating solution feed pipe L is disposed such that the non-aqueous solvent circulating in the circulating solution feed pipe passes upward through the ion exchange resin accommodated in an ion exchange resin container. As a result, even when air bubbles are mixed into the ion exchange resin accommodated in the ion exchange resin container, the non-aqueous solvent passes upward through the ion exchange resin container while the air bubbles in the ion exchange resin being cleared, so that removal thereof can be achieved.

Accordingly, even when air bubbles are mixed into the ion exchange resin accommodated in the ion exchange resin container, the moisture in the ion exchange resin can be removed or reduced with the contact properties between the non-aqueous solvent and the ion exchange resin suitably maintained.

The apparatus for pretreating an ion exchange resin of the present invention has a moisture removal apparatus for removing the moisture in a non-aqueous solvent.

Examples of the moisture removal apparatus include a moisture adsorption apparatus, a membrane separation apparatus, and a gas-liquid separation apparatus, and a moisture adsorption apparatus is preferred.

In the case where the moisture removal apparatus is a moisture adsorption apparatus, it is preferable that the moisture adsorption apparatus accommodate zeolite as moisture adsorbent.

Examples of the zeolite accommodated in the moisture adsorption apparatus is not particularly limited as long as it can adsorb the moisture in a non-aqueous solvent, and examples thereof include one or more selected from crystalline zeolites.

Examples of the crystalline zeolites include one or more selected from A-type, Y-type, X-type, chabazite, ferrierite, ZSM-5, and clinoptilolite.

Further, it is preferable that the crystalline zeolites include Si and Al at a molar ratio Si/Al of 1 to 5. With a molar ratio Si/Al in the range, the zeolite has a stable structure and a moderate cation content to suitably adsorb and remove moisture.

The crystalline zeolite may be one with cations exchanged with lithium ions, calcium ions, etc., or may be one without exchange.

The crystalline zeolite has a pore size of preferably 3 angstrom to 10 angstrom, more preferably 3 angstrom to 6 angstrom, still more preferably 3 angstrom to 5 angstrom.

With a pore size in the range, the crystalline zeolite is able to suitably adsorb and remove the moisture in a non-aqueous solvent.

Incidentally, in the present application document, the pore size means a theoretical value estimated from the crystal structure and the type of cations retained.

As the crystalline zeolite, one having a spherical shape or a cylindrical shape is preferred, and one having a diameter of 0.5 to 5 mm is preferred.

With a diameter in the range, the crystalline zeolite is able to be suitably impregnated with a non-aqueous solvent without degradation of handling properties.

In the apparatus for pretreating an ion exchange resin of the present invention, the accommodation aspect of the zeolite accommodated in a moisture adsorption apparatus is not particularly limited as long as the non-aqueous solvent comes into contact with the zeolite.

For example, the moisture adsorption apparatus may be a column or a tank filled with zeolite through which a non-aqueous solvent can pass.

Alternatively, the moisture adsorption apparatus may be equipped with a pump to make a non-aqueous solvent pass through.

In the apparatus for pretreating an ion exchange resin of the present invention, the liquid flow rate (liquid space velocity) of the non-aqueous solvent passing through zeolite may be appropriately selected from the rates at which the moisture in the ion exchange resin can be removed.

In the apparatus for pretreating an ion exchange resin of the present invention, it is preferable that the circulating solution feed pipe be disposed such that the non-aqueous solvent circulating in the circulating solution feed pipe passes upward through the zeolite accommodated in the moisture adsorption apparatus.

In other words, as shown in FIG. 2 and FIG. 3, in an apparatus 1 for pretreating an ion exchange resin of the present invention, it is preferable that a circulating solution feed pipe L be disposed such that a non-aqueous solvent circulating in the circulating solution feed pipe L passes upward through the zeolite accommodated in a moisture removal apparatus 4.

As described above, the circulating solution feed pipe L is disposed such that the non-aqueous solvent circulating in the circulating solution feed pipe passes upward through the zeolite accommodated in the moisture adsorption apparatus. As a result, even when air bubbles are mixed into the zeolite accommodated in the moisture adsorption apparatus, the non-aqueous solvent passes upward through the moisture adsorption apparatus while the air bubbles in the zeolite being cleared, so that removal thereof can be achieved.

Accordingly, even when air bubbles are mixed into the zeolite accommodated in the moisture adsorption apparatus, the treatment can be performed with the contact properties between the non-aqueous solvent and the zeolite suitable maintained.

As shown in FIG. 2 and FIG. 3, in the apparatus for pretreating an ion exchange resin of the present invention, a circulating solution feed pipe L is disposed such that after a non-aqueous solvent S is passed through an ion exchange resin container 3 and a moisture removal apparatus 4 in this order from the stock solution tank 2, the passed non-aqueous solvent S is returned to the stock solution tank 2 so as to be continuously circulated (FIG. 2), or such that after a non-aqueous solvent is passed through a moisture removal apparatus 4 and an ion exchange resin container 3 in this order from the stock solution tank 2, the passed non-aqueous solvent S is returned to the stock solution tank so as to be continuously circulated (FIG. 3).

In the apparatus for pretreating an ion exchange resin of the present invention, a circulating solution feed pipe is disposed such that the non-aqueous solvent in a stock solution tank is circulated in an ion exchange resin container and a moisture removal apparatus, so that the ion exchange resin can be pretreated through repetition of elution of the moisture remaining in the ion exchange resin by the non-aqueous solvent and adsorption and removal of the moisture eluted into the non-aqueous solvent by the moisture removal apparatus. As a result, in the apparatus for pretreating an ion exchange resin of the present invention, the moisture contained in the ion exchange resin can be easily and economically reduced only by passing a small amount of a non-aqueous solvent through a flow channel of the circulating solution feed pipe.

The apparatus for pretreating an ion exchange resin of the present invention may have a filtration apparatus on the latter stage (downstream side) of a moisture removal apparatus.

In the apparatus for pretreating an ion exchange resin of the present invention, the amount of the non-aqueous solvent used in pretreatment of the ion exchange resin is preferably 1 to 30 times, more preferably 1 to 20 times, still more preferably 1 to 10 times, the unit volume of the ion exchange resin in an ion exchange resin container.

In the apparatus for pretreating an ion exchange resin of the present invention, the amount of the non-aqueous solvent circulating through the circulating solution feed pipe may be appropriately selected from circulation amounts that reduce the adsorbed moisture of the ion exchange resin to a desired degree.

In the apparatus for pretreating an ion exchange resin of the present invention, in the case where, after removal of moisture in the ion exchange resin to a desired degree, the same non-aqueous solvent for use in the removal treatment is used, the apparatus may be used directly.

In the case where a solvent that is different from the non-aqueous solvent for use in removal of moisture in the ion exchange resin is treated, the apparatus may be used, for example, after a non-aqueous solvent to be treated is passed to replace the non-aqueous solvent for use in the pretreatment.

Then, after performing backwashing, extrusion, etc., according to the conventional method, a step of passing the non-aqueous solvent to be treated is performed at an SV (flow rate/ion exchange resin volume ratio) of preferably 1 to 100 $hr^{-1}$, more preferably at an SV of 2 to 50 $hr^{-1}$, still more preferably at an SV of 5 to 20 $hr^{-1}$.

According to the present invention, an apparatus for pretreating an ion exchange resin, capable of easily and economically reducing the moisture content, can be provided.

Next, the method for pretreating an ion exchange resin of the present invention is described.

The method for pretreating an ion exchange resin of the present invention comprises, with the use of an apparatus for pretreating an ion exchange resin having at least a stock solution tank for storing a non-aqueous solvent, an ion exchange resin container accommodating an ion exchange resin, and a moisture removal apparatus for removing moisture in the non-aqueous solvent, performing at least one solution feed process with the non-aqueous solvent circulated, the at least one solution feed process selected from: solution feed process involving returning the non-aqueous solvent that has passed through the ion exchange resin container and the moisture removal apparatus in this order from the stock solution tank, to the stock solution tank; and solution feed process involving returning the non-aqueous solvent that has passed through the moisture removal apparatus and the ion exchange resin container in this order from the stock solution tank, to the stock solution tank.

The method for pretreating an ion exchange resin of the present invention is practically a method for pretreating an ion exchange resin by using the apparatus for pretreating an ion exchange resin of the present invention, and the details of the pretreatment method are common to the description of usage pattern of the apparatus for pretreating an ion exchange resin of the present invention.

According to the present invention, a method for pretreating an ion exchange resin, capable of easily and economically reducing the moisture content, can be provided.

EXAMPLES

Next, the present invention is described in more detail with reference to Examples, which are provided for exemplifying purposes and not intended to limit the present invention.

In the following Examples and Comparative Examples, the moisture content in an organic non-aqueous solvent before treatment (mass ppm) and the moisture content in an organic non-aqueous solvent after treatment (mass ppm) mean values measured by Karl-Fischer method.

The Al content in an organic non-aqueous solvent (mass ppb) means a value measured by inductively coupled plasma-mass spectrometry (ICP-MS), being equivalent to the amount of zeolite eluted from a moisture removal apparatus.

Example 1

An ion exchange resin in an ion exchange resin container 3 was pretreated by using an apparatus 1 for pretreating an ion exchange resin shown in FIG. 2.

In other words, as shown in FIG. 2, after an organic non-aqueous solvent S (moisture content: less than 10 mass ppm) obtained by mixing ethylene carbonate and dimethyl carbonate at a volume ratio of 1:1 and stored in a stock solution tank 2 was passed through an ion exchange resin container 3 accommodating a weakly basic anion exchange resin (MR-type anion exchange resin having a styrene-based resin as matrix and a dimethylamine group as weakly basic anion exchange group) from the bottom to the top in the upward direction at a liquid flow rate of 10 (L/L-resin)/h by using a pump P, the eluted organic non-aqueous solvent was passed through a moisture removal apparatus 4 accommodating crystalline A-type zeolite (pore size: 4 angstrom) from the bottom to the top in the upward direction at a liquid flow rate of 5 (L/L-zeolite)/h, and the eluted organic non-aqueous solvent was returned to the stock solution tank 2. The treatment was continued for 10 hours to perform circulation treatment of the organic non-aqueous solvent in the pretreatment apparatus 1, and then the moisture content in the organic non-aqueous solvent eluted from the ion exchange resin container 3 was measured to be less than 10 mass ppm. The Al content in the organic non-aqueous solvent collected from the stock solution tank 2 was measured to be 16 mass ppb.

Incidentally, the volume of the organic non-aqueous solvent S used was 10 times the unit volume of the ion exchange resin.

Example 2

The pretreatment of an ion exchange resin was performed in the same manner as in Example 1, except that moisture was added to an organic non-aqueous solvent before treatment by an apparatus 1 for pretreating an ion exchange resin so as to use an organic non-aqueous solvent S having a moisture content of 20 mass ppm in Example 1. The moisture content in the organic non-aqueous solvent eluted from the ion exchange resin container 3 was measured to be less than 10 mass ppm.

Incidentally, the volume of the organic non-aqueous solvent S used was 10 times the unit volume of the ion exchange resin.

Example 3

Figure 4:
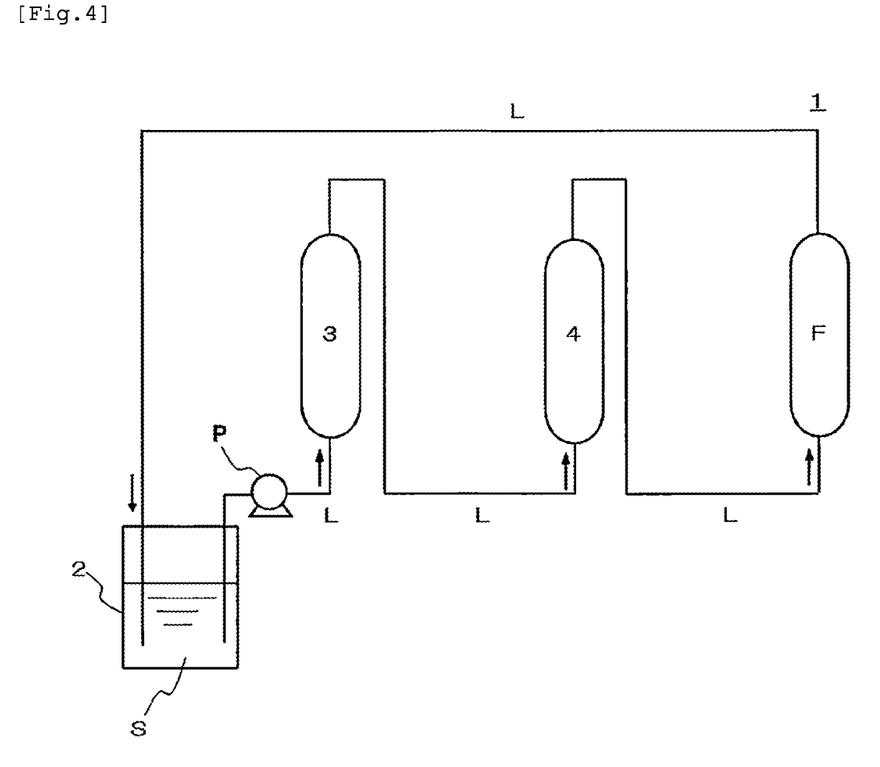
FIG. 4 is a chart illustrating an illustrative aspect of the apparatus for pretreating an ion exchange resin of the present invention.

An ion exchange resin in an ion exchange resin container 3 was pretreated by using an apparatus 1 for pretreating an ion exchange resin shown in FIG. 4.

In other words, as shown in FIG. 4, after an organic non-aqueous solvent S (moisture content: less than 10 mass ppm) obtained by mixing ethylene carbonate and dimethyl carbonate at a volume ratio of 1:1 and stored in a stock solution tank 2 was passed through an ion exchange resin container 3 accommodating a weakly basic anion exchange resin (MR-type anion exchange resin having a styrene-based resin as matrix and a dimethylamine group as weakly basic anion exchange group) from the bottom to the top in the upward direction at a liquid flow rate of 10 (L/L-resin)/h by using a pump P, the eluted organic non-aqueous solvent was passed through a moisture removal apparatus 4 accommodating crystalline A-type zeolite (pore size: 4 angstrom) from the bottom to the top in the upward direction at a liquid flow rate of 5 (L/L-zeolite)/h, and subsequently, the eluted organic non-aqueous solvent was passed through a filtration apparatus F accommodating a filter material made of polypropylene having an aperture diameter of 1 µm in an upward direction at a filtration rate of 0.53 ml/(h·cm$^2$). The eluted organic non-aqueous solvent was returned to the stock solution tank 2. The treatment was continued for 10 hours to perform circulation treatment of the organic non-aqueous solvent in the pretreatment apparatus 1, and then the moisture content in the organic non-aqueous solvent eluted from the ion exchange resin container 3 was measured to be less than 10 mass ppm. The Al content in the organic non-aqueous solvent collected from the stock solution tank 2 was measured to be 3 mass ppb.

Incidentally, the volume of the organic non-aqueous solvent S used was 10 times the unit volume of the ion exchange resin.

Comparative Example 1

Figure 5:
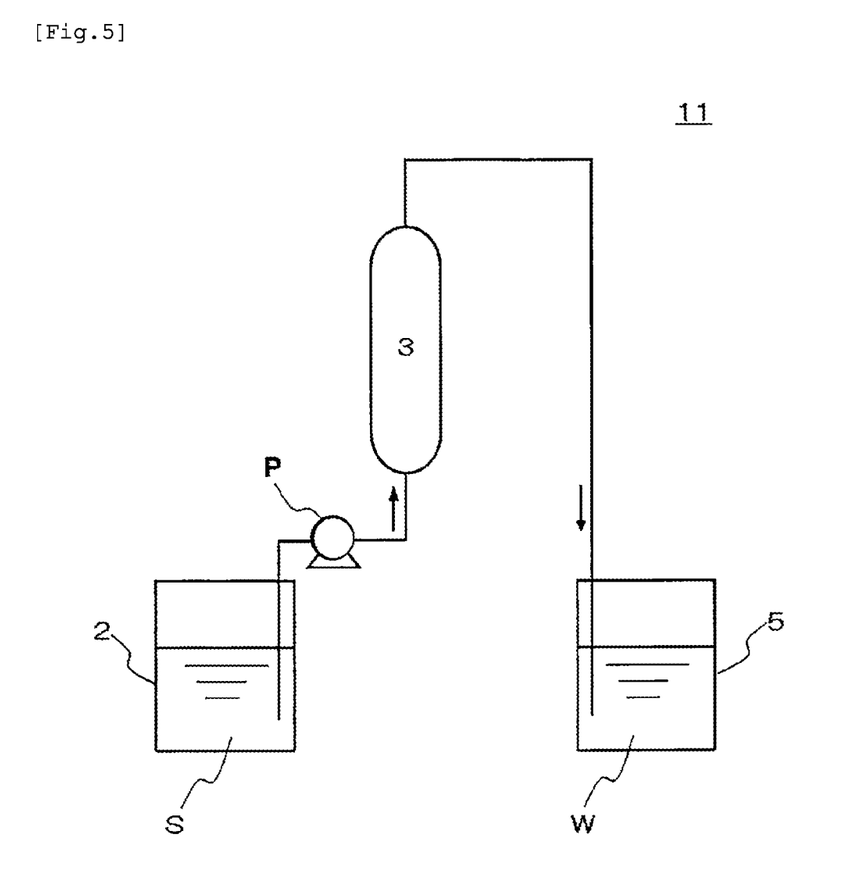
FIG. 5 is a chart illustrating an aspect of the apparatus for pretreating an ion exchange resin in Comparative Example of the present invention.

An ion exchange resin in an ion exchange resin container 3 was pretreated by using an apparatus 11 for pretreating an ion exchange resin shown in FIG. 5.

In other words, as shown in FIG. 5, after an organic non-aqueous solvent S (moisture content: less than 10 mass ppm) obtained by mixing ethylene carbonate and dimethyl carbonate at a volume ratio of 1:1 and stored in a stock solution tank 2 was passed through an ion exchange resin container 3 accommodating a weakly basic anion exchange resin (MR-type anion exchange resin having a styrene-based resin as matrix and a dimethylamine group as weakly basic anion exchange group) from the bottom to the top in the upward direction at a liquid flow rate of 10 (L/L-resin)/h by using a pump P, the eluted organic non-aqueous solvent W was stored in a storage tank 5.

The moisture content in the organic non-aqueous solvent eluted from the ion exchange resin container 3 was measured to be 150 mass ppm.

Incidentally, the volume of the organic non-aqueous solvent S used was 10 times the unit volume of the ion exchange resin.

Comparative Example 2

The pretreatment of an ion exchange resin was performed in the same manner as in Comparative Example 1, except that the volume of the organic non-aqueous solvent S used was 100 times the unit volume of the ion exchange resin in Comparative Example 1. The moisture content in the organic non-aqueous solvent eluted from the ion exchange resin container 3 was measured to be less than 10 mass ppm.

Comparative Example 3

The pretreatment of an ion exchange resin was performed in the same manner as in Comparative Example 2, except that moisture was added to an organic non-aqueous solvent before treatment by an apparatus 11 for pretreating an ion exchange resin so as to use an organic non-aqueous solvent S having a moisture content of 20 mass ppm in Comparative Example 2. The moisture content in the organic non-aqueous solvent eluted from the ion exchange resin container 3 was measured to be 20 mass ppm.

Incidentally, the volume of the organic non-aqueous solvent S used was 100 times the unit volume of the ion exchange resin.

The results in Examples and Comparative Examples described above are shown in Table 1.

Also, from Table 1, it has been found that in Comparative Example 2, the apparatus 11 for pretreating an ion exchange resin has no circulating solution feed pipe L that returns the treated solution to the moisture removal apparatus 4 and the stock solution tank 2 and uses no circulating organic non-aqueous solvent, so that 10 times the amount of the organic non-aqueous solvent is required in comparison with Example 1 for reducing the moisture content in the organic non-aqueous solvent eluted from the ion exchange resin to the equivalent level in Example 1.

Further, from Table 1, it has been found that in Comparative Example 3, the apparatus 11 for pretreating an ion exchange resin has no circulating solution feed pipe L that returns the treated solution to the moisture removal apparatus 4 and the stock solution tank 2 and uses no circulating organic non-aqueous solvent, so that in the case where the organic non-aqueous solvent before treatment has a large moisture content of 20 mass ppm, the moisture contained in the ion exchange resin is insufficiently reduced even with use of 10 times the amount of organic non-aqueous solvent in comparison with Example 1.

INDUSTRIAL APPLICABILITY

According to the present invention, an apparatus for pretreating ion exchange resin and a method for pretreating ion exchange resin, capable of easily and economically reducing the moisture content, can be provided.

TABLE 1

|  | Example 1 | Example 2 | Example 3 | Comparative Example 1 | Comparative Example 2 | Comparative Example 3 |
|---|---|---|---|---|---|---|
| Moisture content in organic non-aqueous solvent S before treatment (mass ppm) | <10* | 20 | <10* | <10* | <10* | 20 |
| Amount of organic non-aqueous solvent used per unit amount of ion exchange resin (volume ratio) | 10 | 10 | 10 | 10 | 100 | 100 |
| Moisture content in organic non-aqueous solvent eluted from ion exchange resin container 3 after treatment (mass ppm) | <10* | <10* | <10* | 150 | <10* | 20 |
| Amount of Al in organic non-aqueous solvent S after treatment (mass ppb) | 16 | — | 3 | — | — | — |

*<10 means less than 10 mass ppm.

From Table 1, it has been found that in Example 1 to Example 3, in the apparatus 1 for pretreating an ion exchange resin, after the organic non-aqueous solvent S from the stock solution tank 2 is passed through the ion exchange resin container 3 and the moisture removal apparatus 4 in this order, the passed non-aqueous solvent is returned to the stock solution tank 2 for circulation treatment, so that the moisture contained in the ion exchange resin accommodated in the ion exchange resin container 3 can be easily and economically reduced.

It has been also found that in Example 3, the apparatus further has a filtration apparatus F on the downstream side of the moisture removal apparatus, so that in comparison with the pretreatment apparatus 1 having no filtration apparatus F in Example 1, the Al content in the organic non-aqueous solvent is more reduced with prevention of mixing of zeolite particles into the ion exchange resin container.

In contrast, from Table 1, it has been found that in Comparative Example 1, the apparatus 11 for pretreating an ion exchange resin has no circulating solution feed pipe L that returns the treated solution to the moisture removal apparatus 4 and the stock solution tank 2 and uses no circulating organic non-aqueous solvent, so that even with the same amount of non-aqueous solvent used, the moisture contained in the ion exchange resin is insufficiently reduced.

REFERENCE SIGN LIST

1: APPARATUS FOR PRETREATING ION EXCHANGE RESIN
2: STOCK SOLUTION TANK
3: ION EXCHANGE RESIN CONTAINER
4: MOISTURE REMOVAL APPARATUS
5: STORAGE TANK

The invention claimed is:

1. An apparatus for pretreating an ion exchange resin comprising:
   at least a stock solution tank for storing a non-aqueous solvent, an ion exchange resin container accommodating an ion exchange resin, and a moisture removal apparatus for removing moisture in the non-aqueous solvent, and
   at least one solution feed pipe selected from: a circulating solution feed pipe for returning, to the stock solution tank, the non-aqueous solvent that has passed through the ion exchange resin container and the moisture removal apparatus in this order from the stock solution tank; and a circulating solution feed pipe for returning, to the stock solution tank, the non-aqueous solvent that has passed through the moisture removal apparatus and the ion exchange resin container in this order from the stock solution tank; wherein the moisture removal apparatus is a moisture adsorption apparatus.

2. The apparatus for pretreating an ion exchange resin according to claim 1, wherein the moisture adsorption apparatus accommodates zeolite as moisture adsorbent.

3. The apparatus for pretreating an ion exchange resin according to claim 2, wherein the circulating solution feed pipe is disposed such that the non-aqueous solvent circulating in the circulating solution feed pipe passes upward through the zeolite accommodated in the moisture adsorption apparatus.

4. The apparatus for pretreating an ion exchange resin according to claim 1, further comprising a filtration apparatus on the downstream side of the moisture removal apparatus.

5. The apparatus for pretreating an ion exchange resin according to claim 1, wherein the ion exchange resin is an anion exchange resin.

6. The apparatus for pretreating an ion exchange resin according to claim 1, wherein the ion exchange resin is a weakly basic anion exchange resin.

7. A method for pretreating an ion exchange resin comprising:

with the use of an apparatus for pretreating an ion exchange resin having at least a stock solution tank for storing a non-aqueous solvent, an ion exchange resin container accommodating an ion exchange resin, and a moisture removal apparatus for removing moisture in the non-aqueous solvent, performing at least one solution feed process with the non-aqueous solvent circulated, the at least one solution feed process selected from: solution feed process involving returning the non-aqueous solvent that has passed through the ion exchange resin container and the moisture removal apparatus in this order from the stock solution tank, to the stock solution tank; and solution feed process involving returning the non-aqueous solvent that has passed through the moisture removal apparatus and the ion exchange resin container in this order from the stock solution tank, to the stock solution tank; wherein the moisture removal apparatus is a moisture adsorption apparatus.

* * * * *